(12) United States Patent
Welle et al.

(10) Patent No.: US 7,893,582 B2
(45) Date of Patent: Feb. 22, 2011

(54) HOLLOW MOTOR DRIVE DEVICE WITH AN OFFSET MAGNET, SHAFT, AND NUT

(75) Inventors: Reinhart G Welle, Ratingen (DE); Dirk Loeckmann, Ratingen (DE)

(73) Assignees: THK Co., Ltd, Tokyo (JP); THK GmbH, Ratingen (DE)

( * ) Notice: Subject to any disclaimer, the term of this patent is extended or adjusted under 35 U.S.C. 154(b) by 285 days.

(21) Appl. No.: 12/162,679

(22) PCT Filed: Dec. 26, 2006

(86) PCT No.: PCT/JP2006/325852

§ 371 (c)(1),
(2), (4) Date: Jul. 30, 2008

(87) PCT Pub. No.: WO2007/088691

PCT Pub. Date: Aug. 9, 2007

(65) Prior Publication Data

US 2009/0001837 A1    Jan. 1, 2009

(30) Foreign Application Priority Data

Jan. 31, 2006    (JP) .............................. 2006-023322

(51) Int. Cl.
*H02K 7/06* (2006.01)
(52) U.S. Cl. ................ 310/80; 310/156.18; 310/156.22
(58) Field of Classification Search ................... 310/80, 310/75 D, 156.18, 156.22
See application file for complete search history.

(56) References Cited

U.S. PATENT DOCUMENTS

| | | | | |
|---|---|---|---|---|
| 3,082,338 A | * | 3/1963 | Turk ................... | 310/216.121 |
| 5,130,585 A | * | 7/1992 | Iwamatsu et al. ............. | 310/59 |
| 6,244,374 B1 | * | 6/2001 | Tomita et al. ................ | 180/446 |
| 7,262,525 B2 | * | 8/2007 | Kawakami et al. ............ | 310/20 |
| 2004/0095032 A1 | * | 5/2004 | Hase et al. ............. | 310/156.12 |
| 2005/0012407 A1 | * | 1/2005 | Kawakami et al. ............ | 310/43 |
| 2006/0038457 A1 | * | 2/2006 | Miyata ................... | 310/156.45 |
| 2009/0001837 A1 | * | 1/2009 | Welle et al. ............ | 310/156.12 |

FOREIGN PATENT DOCUMENTS

| | | |
|---|---|---|
| JP | 1-311845 | 12/1989 |
| JP | 6-53851 | 7/1994 |
| JP | 6-300106 | 10/1994 |
| JP | 3006562 | 1/1995 |
| JP | 9-28067 | 1/1997 |
| JP | 11-122865 | 4/1999 |
| JP | 2002-12158 | 1/2002 |

* cited by examiner

*Primary Examiner*—Karl I Tamai
(74) *Attorney, Agent, or Firm*—Young & Thompson

(57) ABSTRACT

A hollow motor drive device includes a screw shaft provided with a spiral screw groove formed in an outer peripheral surface thereof, a nut member screw-engaged with the screw groove, a hollow drive shaft having an inner peripheral side on which the nut member is fixed and an outer peripheral side on which a permanent magnet is disposed, and a housing provided with a bearing portion rotatably supporting the hollow drive shaft and a coil portion. In the hollow drive shaft, the nut member and the permanent magnet are disposed so as not to be overlapped with each other in a direction perpendicular to the axial direction of the hollow drive shaft, and in the housing, the bearing portion is disposed to a position corresponding to the nut member, and the coil portion is disposed to a position corresponding to the permanent magnet.

3 Claims, 4 Drawing Sheets

HOLLOW MOTOR DRIVE DEVICE WITH AN OFFSET MAGNET, SHAFT, AND NUT

TECHNICAL FIELD

The present invention relates to a hollow motor drive device provided by combining a screw/nut mechanism capable of alternatively converting rotational motion and reciprocal linear motion and a hollow motor having no motor drive shaft.

BACKGROUND ART

Conventionally, as a drive device for performing a single directional reciprocal linear motion by using a hollow motor, there is known, for example, a drive device disclosed in the following Patent Publication 1. In this drive device, a driven rod is disposed in a manner of penetrating an inner hollow portion of the hollow motor, and a rotating motion of a tubular rotor forming the hollow portion is transmitted as a linear driving force of the driven rod. More specifically, a female thread is formed to an inner peripheral surface of the rotor and a male thread capable of being screw-engaged with the female thread is formed to an outer peripheral surface of the driven rod so as to screw the driven rod in the inner peripheral surface of the rotor. Further, a spline is formed in the outer peripheral surface of the driven rod in a state overlapped with the male thread, and a spline groove to be engaged with this spline is formed on the rotor side, and according to this structure, the driven rod is movable in a center axis direction but is not rotated about the center axis.

Patent Publication 1: Japanese Utility Model Laid-open Publication No. 6-53851

Patent Publication 2: Japanese Patent Laid-open Publication No. 6-300106

DISCLOSURE OF THE INVENTION

Problems to be Solved by the Invention

However, for the drive device disclosed in the above Patent Publication 1, the linear motion is stopped by a self-retaining force of the motor, and accordingly, it is difficult to perform the positioning of the driven rod at a high precision, thus providing a problem. In addition, although a pair of bearings is arranged on both side of the hollow motor for supporting the tubular rotor, this arrangement deteriorates maintenance performance of the hollow motor and makes complicated an assembling working.

Furthermore, the above Patent Publication 2 discloses a drive device for improving a positioning performance of the driven rod. The drive device disclosed in this Patent Publication 2 employs a structure in combination of the hollow motor, a ball screw/nut and a spline mechanism, and by employing the ball screw/nut, a diameter of the rotation driving portion is made small, and as a result, since an inertia moment is possibly made small, a device having good stop-responsiveness has been realized.

However, the drive device disclosed in the above Patent Publication 2 employs the structure in which the hollow motor, the ball screw/nut and the spline mechanism are arranged in series, so that although the high rigidity can be realized, the size of the device is made large, thus providing a problem. Specifically, in such drive device, the elongation of the device in its axial direction results in the limitation in location space, thus narrowing an applicable range of the device.

The present invention was conceived in consideration of the above problems, and an object thereof is to provide a hollow motor drive device having high rigidity and improved stop-responsiveness, as well as having well maintenance performance and compact structure of the device.

Means for Solving the Problems

The hollow motor drive device according to the present invention includes:

a screw shaft provided with a spiral screw groove formed in an outer peripheral surface thereof;

a nut member provided with a nut groove formed in an inner peripheral surface thereof so as to be screw-engaged with the screw groove;

a hollow drive shaft having an inner peripheral side on which the nut member is fixed and an outer peripheral side on which a permanent magnet, as a field magnetic flux generating source, is disposed; and a housing provided with a bearing portion rotatably supporting the hollow drive shaft and a coil portion as a magnetic field generating source, wherein, in the hollow drive shaft, the nut member and the permanent magnet are disposed so as not to be overlapped with each other in a direction perpendicular to the axial direction of the hollow drive shaft, and in the housing, the bearing portion is disposed to a position corresponding to the nut member, and the coil portion is disposed to a position corresponding to the permanent magnet.

That is, in the hollow motor drive device of the present invention, there is employed a structure in which the screw groove of the screw shaft and the nut groove of the nut member are engaged in a screw-slidable state, and the nut member received with the rotational drive force from the screw shaft is fixed to the hollow drive shaft, so that the inertia moment at the hollow motor operation stop time can be made possibly small, thus realizing a very improved stop-responsiveness. In addition, since the load transferred from the screw shaft to the hollow drive shaft through the nut member is received by the bearing portion in which a plurality of bearings are concentrated at one portion, so that the device having the compact structure and having high rigidity can be realized.

In the hollow motor drive device according to the present invention, the housing may include a bearing accommodation portion accommodating the bearing portion and a coil accommodation portion accommodating the coil portion.

That is, in the hollow motor drive device of the present invention, the hollow motor portion as a power drive source composed of the coil portion and the permanent magnet and the screw/nut mechanism as driving power converting means composed of the nut member and the bearing portion are separately located. This can provide a simple structure, and easy assembling working with improved maintenance performance.

Furthermore, in the hollow motor drive device according to the present invention, the coil accommodation portion constituting the housing may have a detachable structure.

That is, by detachably mounting the coil accommodation portion constituting the housing, only the hollow motor portion can be exchanged, and for example, by changing the coil portion and the permanent magnet, the rated power of the hollow motor drive device can be easily changed.

Still furthermore, in the hollow motor drive device according to the present invention, the permanent magnet may be provided for the hollow drive shaft through a position adjusting mechanism so as to adjust a distance between the permanent magnet and the coil portion.

That is, according to the hollow motor drive device of the present invention, the distance between the permanent magnet and the coil portion can be easily adjusted, so that the adjustment of the hollow motor portion can be easily done at the initial setting of the device assembling time or device maintaining time.

Still furthermore, in the hollow motor drive device according to the present invention, the position adjusting mechanism may include:

a magnet holding member disposed so as to be connected to the permanent magnet;

a spannring interposed between the magnet holding member and the hollow drive shaft, in which movement of one end side toward one end side axial direction is restricted by abutment of the one end against an engaging wall formed to the hollow drive shaft;

a spacer sleeve disposed on another end side of the spannring to be movable in an axial direction of the hollow drive shaft; and a thrust nut pushing the spannring in the one end side axial direction through the spacer sleeve by screw-engagement with a screw groove formed in a surface of the hollow drive shaft.

Further, the concept of the present invention mentioned above does not mention all the necessary subject features of the present invention, and sub-combination of these features may also constitute the present invention.

Effects of the Invention

According to the present invention, there is provided a hollow motor drive device having a high rigidity, good stop-responsiveness and improved maintenance performance as well as compact device structure.

EXPLANATION OF REFERENCE NUMERALS

10—hollow motor drive device, 11—screw/nut mechanism, 12—screw shaft, 12a—screw groove, 13—nut member, 14—bearing, 21—hollow motor, 22—coil, 23—permanent magnet, 25—hollow drive shaft, 25a, 25b—engaging wall, 26—housing, 26a—end lid portion, 26b—bearing accommodation portion, 26c—flanged portion, 26d—coil accommodation portion, 27—bolt, 30—position adjusting mechanism, 31—magnet holding member, 32—spannring, 33—spacer sleeve, 34—rotary encoder, 35—thrust nut, 36—encoder sensor, 37—stopper nut, 40—block member, 45—linear guide, 45a—movable block, 45b—track rail.

BEST MODE FOR CARRYING OUT THE INVENTION

Hereunder, a preferred embodiment for embodying the present invention will be explained with reference to the accompanying drawings. Further, it is to be noted that the following embodiment does not limit the invention of appended respective claims, and all the combinations of subject features explained in the embodiment is not necessarily essential for the solution of the problems.

Figure 1:
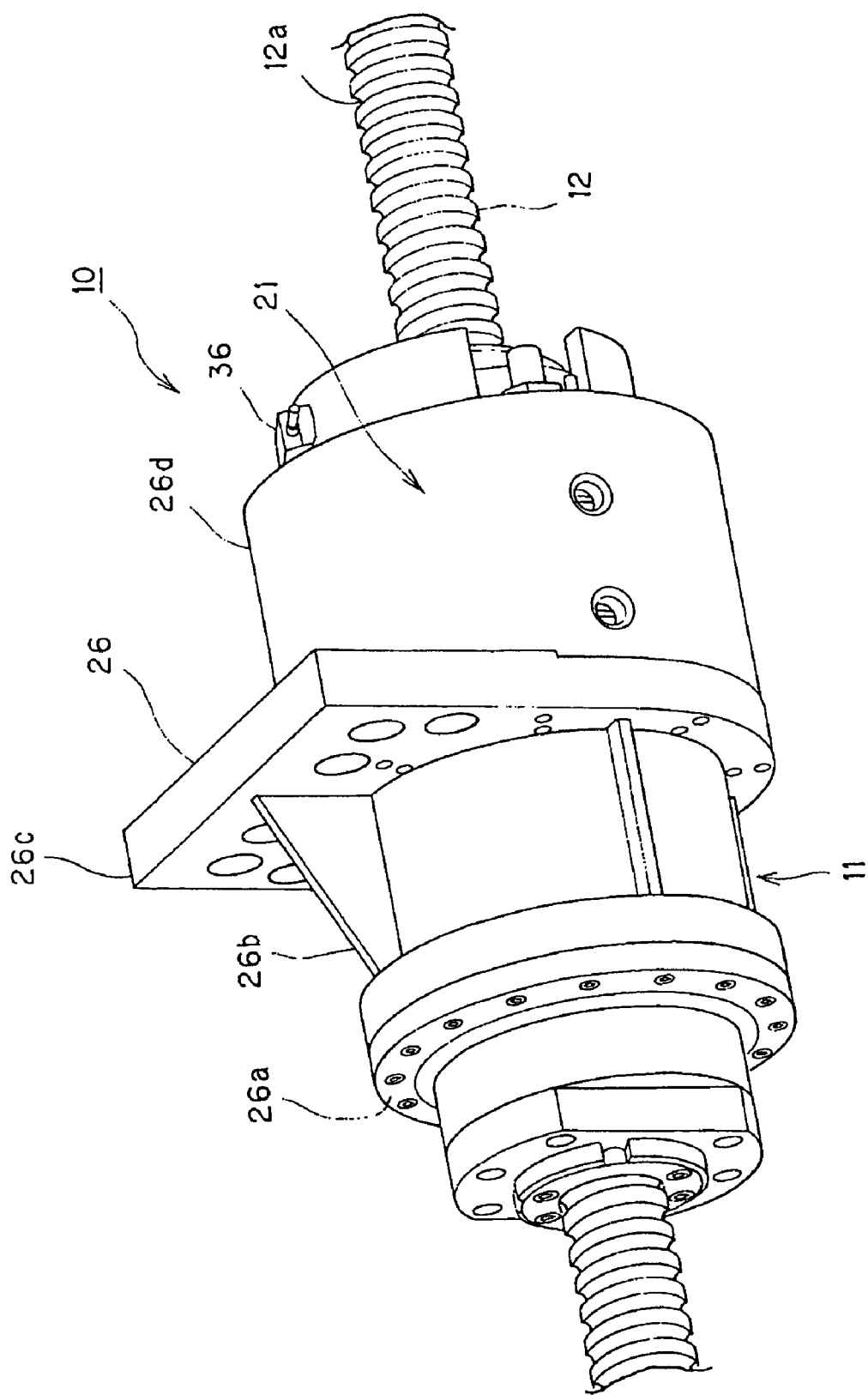
FIG. 1 is a perspective view showing outer configuration of an essential portion of a hollow motor drive device according to an embodiment of the present invention.
Figure 2:
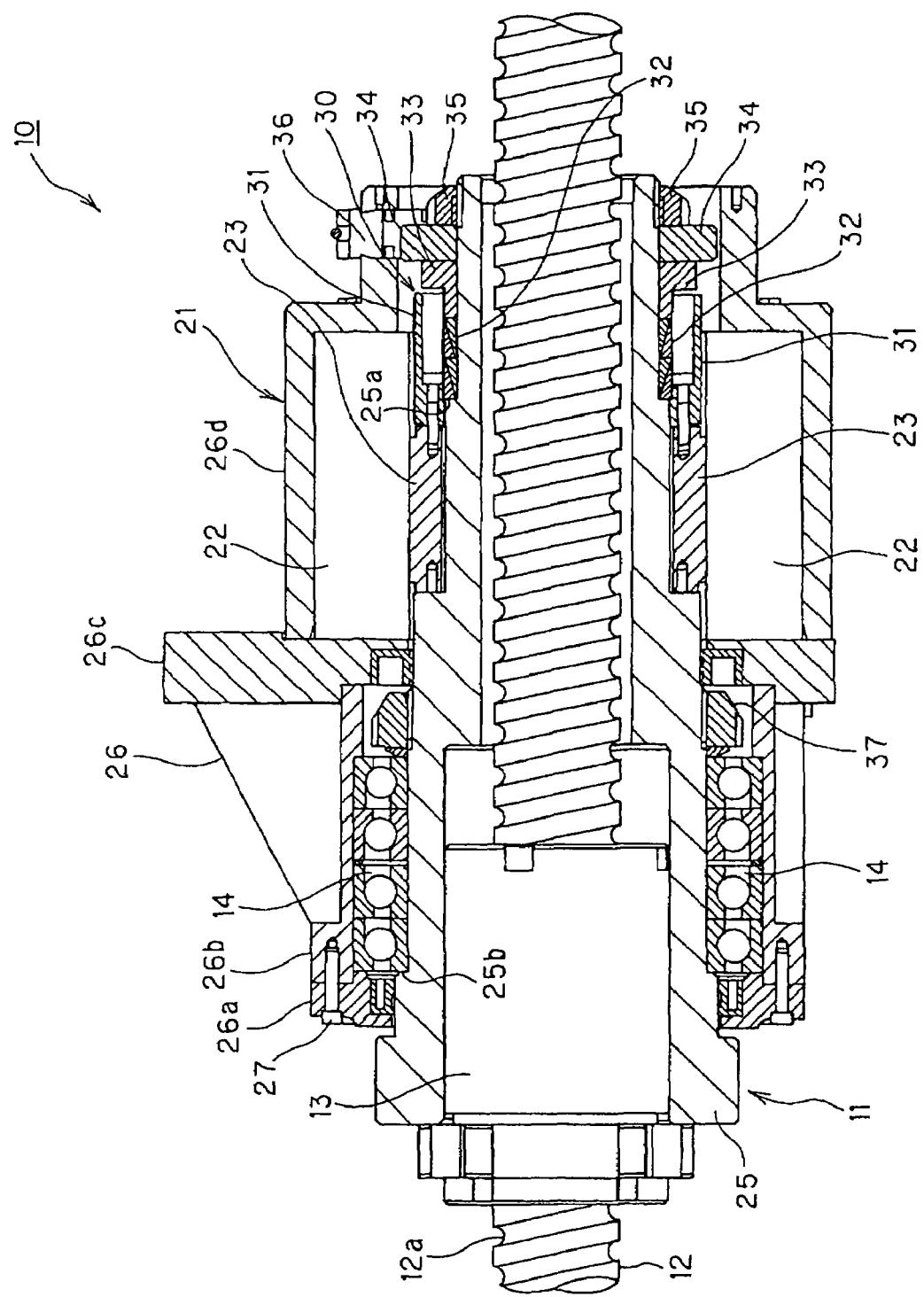
FIG. 2 is a longitudinal sectional front view showing an essential portion of a structure of the hollow motor drive device of the embodiment.

FIG. 1 is a perspective view showing an outer configuration of an essential portion of the hollow motor drive device of the present embodiment. FIG. 2 is a longitudinal sectional front view showing an essential portion of a structure of the hollow motor drive device of the embodiment.

A hollow motor drive device 10 according to the present embodiment is provided with: a screw/nut mechanism 11, as a driving force converting means, composed of a screw shaft 12, a nut member 13 and a bearing 14; and a hollow motor portion 21, as a driving power generating source, composed of a coil portion 22 and a permanent magnet 23. The screw/nut mechanism 11 and the hollow motor portion 21 are combined via a hollow drive shaft 25. The hollow drive shaft 25 is positioned between the nut member 13 and the bearing 14 so as to transmit a load of the nut member 13 to the bearing and serves as a rotor of the hollow motor portion 21 by arranging the permanent magnet 23 on an outer peripheral side thereof.

The screw shaft 12 constituting the screw/nut mechanism 11 is a member having an outer peripheral surface in which a spiral screw groove 12a is formed and constitutes a reference at an operation of the hollow motor drive device 10. On the other hand, the nut member 13 is a member having an inner peripheral surface in which a nut groove, not shown, screwed with the screw groove 12a of the screw shaft 12, and by screwing this nut member 13 with the screw shaft 12, a sliding screw is formed. Accordingly, when the nut member 13 performs rotational motion, a relative reciprocal linear motion of the screw shaft 12 in the axial direction with respect to the nut member is enabled.

The nut member 13 is set and fixed on the inner peripheral side of the hollow drive shaft 25 acting as a rotor of the hollow motor portion 21 and is rotated together with the rotational motion of the hollow drive shaft 25. Further, the nut member 13 is supported by the bearing 14 via the hollow drive shaft 25, and according to this structure, the stable rotational motion of the nut member 13 can be realized.

The nut member 13 is fixed to the inner peripheral side of the hollow drive shaft 25, and accordingly, as mentioned above, the hollow drive shaft 25 is disposed between the nut member 13 and the bearing 14 so as to receive and transfer a load. Furthermore, since the permanent magnet 23 as a field magnetic flux generation source is disposed on the outer peripheral side thereof, the hollow drive shaft 25 also serves as a rotor of the hollow motor portion 21. The coil portion 22 forming the magnetic field generation source is disposed to a position opposing to the permanent magnet 23 formed to the hollow drive shaft 25, and the permanent magnet 23 and the coil portion 22 constitute, in combination, a hollow motor.

Further, in the described embodiment, the mounting of the permanent magnet 23 with respect to the hollow drive shaft 25 is performed through the position adjusting mechanism 30. According to the function of the position adjusting mechanism 30, the distance between the permanent magnet 23 and the coil portion 22 is freely adjustable. This position adjusting mechanism 30 is composed of a magnet retaining member 31, a spannring 32, a spacer sleeve 33 and a thrust nut 35. Specific structure and function of the position adjusting mechanism 30 will be explained hereunder.

Generally, the permanent magnet 23 is composed of a plurality of plate-shaped permanent magnet members, which are connected respectively by heat resistive flexible material so as to surround the hollow drive shaft 25 to be slightly movable in the outer diameter direction of the hollow drive shaft 25. By applying a moving force in the radial direction to the permanent magnet 23 having the above-mentioned structure, the movement of the hollow drive shaft 25 in the outer diameter direction or inner diameter direction is realized, and the distance between the permanent magnet 23 and the coil portion 22 becomes adjustable. However, since it is not preferred to apply the moving force directly to the permanent magnet 23, a structure such that the magnet retaining member 31 is connected to the permanent magnet 23 is employed. Accordingly, the moving force to the permanent magnet 23 is applied through the magnet retaining member 31.

The spannring 32 is interposed between the magnet retaining member 31 and the hollow drive shaft 25. This spannring 32 constitutes a wedge-shaped friction fastening member capable of adjusting a distance between the magnet retaining member 31 and the hollow drive shaft 25 and converting a pressing force in the axial direction to a moving force in a direction perpendicular to the axial direction (i.e., radial direction). That is, the spannring 32 according to the present embodiment abuts, at one end (left side end in FIG. 2), against an engaging wall 25a formed to the hollow drive shaft 25 to thereby restrict further movement thereof in one end side axial direction, and the other end (right side end in FIG. 2) takes a free state in relation to the hollow drive shaft 25. Accordingly, when the spannring 32 is pressed to the one end side axial direction from the other end side, this axial pressing force is converted as the moving force in the outer diameter direction, and reversely, when the spannring 32 is operated so as to loose the pressing force to the one end side axial direction from the other end side, the moving force in the inner diameter direction is obtained by the loosening of this axial pressing force, so that it becomes possible to adjust the position in the radial direction of the permanent magnet 23 connected to the magnet retaining member 31.

The pressing to the spannring 32 is realized by a spacer sleeve 33 disposed on the other end side (right end side in FIG. 2) of the spannring 32 to be movable in the axial direction of the hollow drive shaft 25 and a thrust nut 35 capable of pressing the spannring 32 in the one end side axial direction (left end side in FIG. 2) through the spacer sleeve 33 by screw-engaging with the screw groove formed in the surface of the hollow drive shaft 25.

As mentioned above, in the hollow motor drive device 10 according to the present embodiment, the permanent magnet 23 is mounted to the hollow drive shaft 25 through the position adjusting mechanism 30, so that the distance between the permanent magnet 23 and the coil portion 22 can be extremely easily adjusted. Accordingly, for the hollow motor drive device 10 of the present embodiment, the initial setting at the time of assembling the device and the adjustment of the hollow motor portion 21 at the time of maintaining the device can be easily performed.

Further, a rotary encoder 34 is disposed between the spacer sleeve 33 and the thrust nut 35 provided for the hollow drive shaft 25, and an encoder sensor 36 is disposed in the housing 26 (coil accommodation portion 26d) opposing to the rotary encoder 34. In the hollow motor portion 21 of the present embodiment, by the arrangement of the rotary encoder 34 and the encoder sensor 36, an angular position of the hollow motor is detected to thereby perform motor control as a synchronous motor.

The operating system of the hollow motor portion 21 according to the present embodiment employs a rectangular wave drive system in which position information of the hollow drive shaft 25 as a rotor is detected by the rotary encoder 34 and the encoder sensor 36, and rotation control is performed by switching a current conducting phase every 60 degrees (every 60 degrees with respect to electric angle of 360 degrees). This system has a merit such that a large torque is obtainable with a small current.

Furthermore, the outer configuration of the hollow motor drive device 10 according to the present embodiment is composed of the housing 26 accommodating the bearing portion 14 and the coil portion 22. The housing 26 of the present embodiment is composed of, for example, as shown in FIGS. 1 and 2, the end lid portion 26a forming the end portion of the housing 26, the bearing accommodating portion 26b accommodating the bearing 14, the flanged portion 26c as fastening means for the device and the coil accommodating portion 26d accommodating the coil portion 22.

Further, the end lid portion 26a, the bearing accommodating portion 26b, the flanged portion 26c and the coil accommodating portion 26d constituting the housing 26 may be connected by fastening means such as bolts 27, and particularly, the coil accommodating portion 26d may be preferably formed to be detachable. As mentioned, the detachable structure of the coil accommodation portion 26d enables only the hollow motor portion 21 to be exchanged, and by exchanging the coil portion 21 and the permanent magnet 23, the rated power of the hollow motor drive device 10 can be optionally and easily changed.

Hereinabove, although the constitutional members of the hollow motor drive device according to the present embodiment was described, as mentioned with reference to FIGS. 1 and 2, in the hollow motor drive device 10 of the present embodiment, the nut member 13 and the permanent magnet 23 are disposed, on the hollow drive shaft 25, so as not to be overlapped with each other in the direction perpendicular to the axial direction of the hollow drive shaft 25, and on the side of the housing 26, the bearing portion 14 is disposed at a position corresponding to the nut member 13 and the coil portion 22 is also disposed at a position corresponding to the permanent magnet 23. That is, in the hollow motor drive device 10 of the present embodiment, a load transmitted from the screw shaft 12 to the hollow drive shaft 25 through the nut member 13 is received by the bearing portion (bearings) 14 gathered at one place, so that the device having compact structure with high rigidity can be provided.

Furthermore, in the hollow motor drive device according to the present embodiment, the thread groove 12a of the screw shaft 12 and the nut groove of the nut member 13 are screw engaged in a slidable state, and in addition, the nut member 13 receiving the rotational driving force from the screw shaft 12 is fixed to the hollow drive shaft 25, so that the inertia moment at the operation stop time of the hollow motor can be made possibly small, thus realizing very excellent stop responsiveness.

Still furthermore, the hollow motor drive device 10 of the present embodiment employs a simple device structure in which the screw/nut mechanism 11 and the hollow motor portion 21 are disposed separately, so that the hollow motor drive device 10 can be well maintained and easily assembled with high workability.

Hereinabove, the structure of the hollow motor drive device 10 of the present embodiment was described. Hereunder, assembling method of the hollow motor drive device 10 according to the present embodiment will be described.

In an assembling process of the hollow motor drive device 10 according to the present embodiment, at first, a plurality of bearings (bearing portion 14) are disposed with respect to the hollow drive shaft 25 in which the nut member 13 is located on the inner peripheral side and the permanent magnet 23 is located on the outer peripheral side to thereby form a bearing portion 14. The movement of the bearing portion 14 in the one end side axial direction is limited by the abutment of one end side (left side on the drawing of FIG. 2) against the engaging wall 25b formed to the hollow drive shaft 25. In this state, by fixing the other end side (right side on the drawing of FIG. 2) of the bearing portion 14 with the stopper nut 37 screw-engaged with the hollow drive shaft 25, the bearing portion 14 can be surely positioned.

Subsequently, in order to accommodate and protect the outer peripheral surface of the bearing portion 14, the end lid portion 26a, the bearing accommodation portion 26b and the flanged portion 26c among the members constituting the housing 26 are located. Thereafter, the coil accommodation portion 26d accommodating the coil portion 22 is also located, and by operating the position adjusting mechanism 30, the distance between the permanent magnet 23 and the coil portion 22 is adjusted. The operation of the position adjusting mechanism 30 is basically performed by adjusting the moving distance in the outer diameter or inner diameter direction of the spannring 32 through the adjustment of the fastening amount of the thrust nut 35.

Finally, the encoder sensor 36 is mounted to the coil accommodation portion 26d constituting the housing 26 to thereby complete the assembling of the hollow motor drive device according to the present embodiment.

Figure 3:
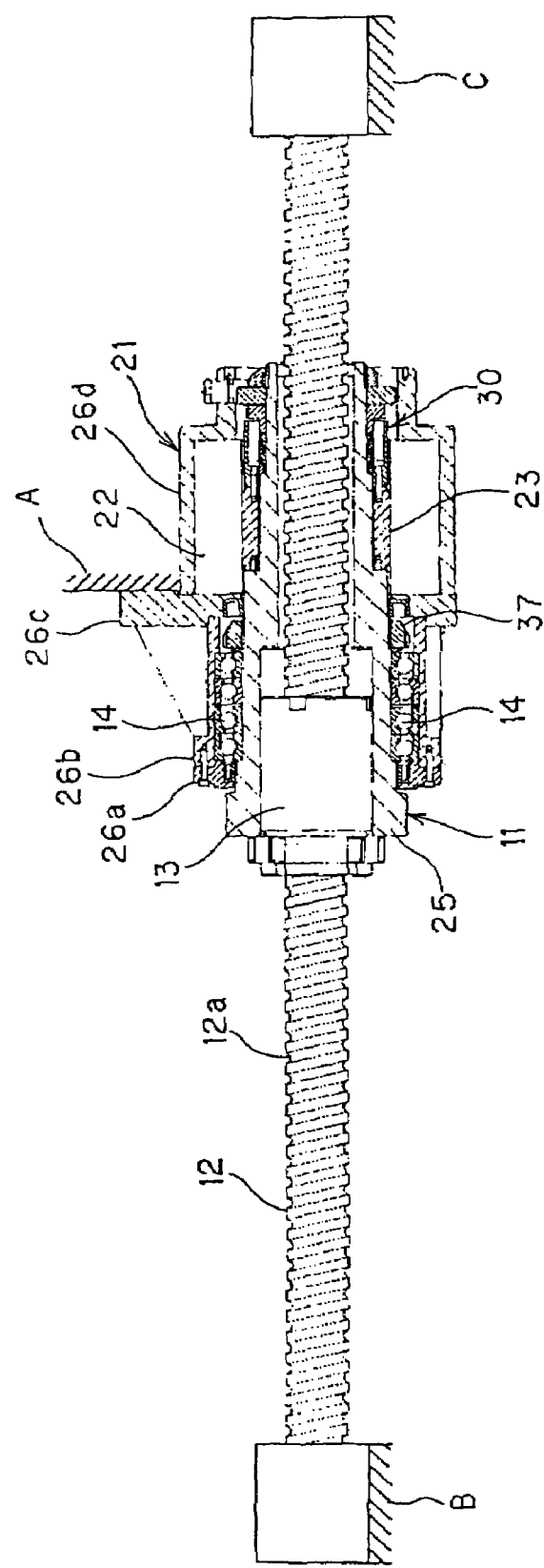
FIG. 3 is a longitudinal sectional front view for explaining an operation of the hollow motor drive device according to the embodiment.

Hereunder, the operation of the hollow motor drive device according to the present embodiment will be described with reference to FIG. 3, which is a vertical sectional front view for explaining the operation of the hollow motor drive device according to the present embodiment.

The hollow motor drive device 10 of the present embodiment may provide at least three operation methods.

At first, in the first operation method, the body portion of the hollow motor drive device 10, i.e., the flanged portion 26c constituting the housing 26 designated by the character "A" is fixed so as to provide a free state of the screw shaft 12. In this state, when the hollow motor portion 21 is driven, the screw shaft 12 performs the reciprocal motion in its axial direction. At this time, the screw shaft 12 does not perform the rotational motion around the axis and performs only the reciprocal motion, and accordingly, by locating an article to be driven to the screw shaft 12, the driving operation of the article becomes allowable.

Secondarily, in the next operation method, the screw shaft 12 is secured by fixing both or at least one of the portions designated by the characters "B" and "C", and the article to be driven is then fixed to the position, shown by the character "A", of the flanged portion 26c. In this state, when the hollow motor portion 21 is driven, only the screw shaft 12 becomes stationary state, and the main body portion of the hollow motor drive device 10 including such as the screw/nut mechanism 11 and the hollow motor portion 21 performs the reciprocal linear motion in the axial direction. Accordingly, the article is driven together with the main body portion of the hollow motor drive device 10.

Finally, the third operation method is a method of the combination of the above-mentioned first and second operation methods. That is, articles to be driven are located to all the positions shown by the characters "A" to "C", and the articles are restricted and/or released by controlling the operation conditions of the hollow motor portion 21, thus enabling the complicated driving and operating of the articles to be performed.

EXAMPLE

A specific using example of the hollow motor drive device 10 according to the present embodiment mentioned hereinabove will be explained hereunder with reference to FIG. 4, which is a perspective view showing the using example of the hollow motor drive device of the present embodiment.

In the hollow motor drive device 10 of the present embodiment, the flanged portion 26c among the members constituting the housing 26 is removed and the block body 40 having rectangular shape is located to the outer peripheral portion of the housing 26. Further, two linear guides 45 are disposed below the block body 40, a movable block 45a constituting the linear guide 45 is connected to the block body 40, and a track rail 45b constituting the linear guide 45 is connected to a pedestal as a location standard.

Then, when the hollow motor portion 21 is driven with the screw shaft 12 being fixed, only the block body 40 is moved in the axial direction, and on the other hand, when the hollow motor portion 21 is driven with the block body being secured, only the screw shaft 12 is moved in the axial direction. When the hollow motor portion 21 is driven under the adjustment of the restricted and/or released condition of the screw shaft 12 and the block body 40, the complicated moving operations in the axial directions of the screw shaft 12 and the block body 40 can be realized.

Figure 4:
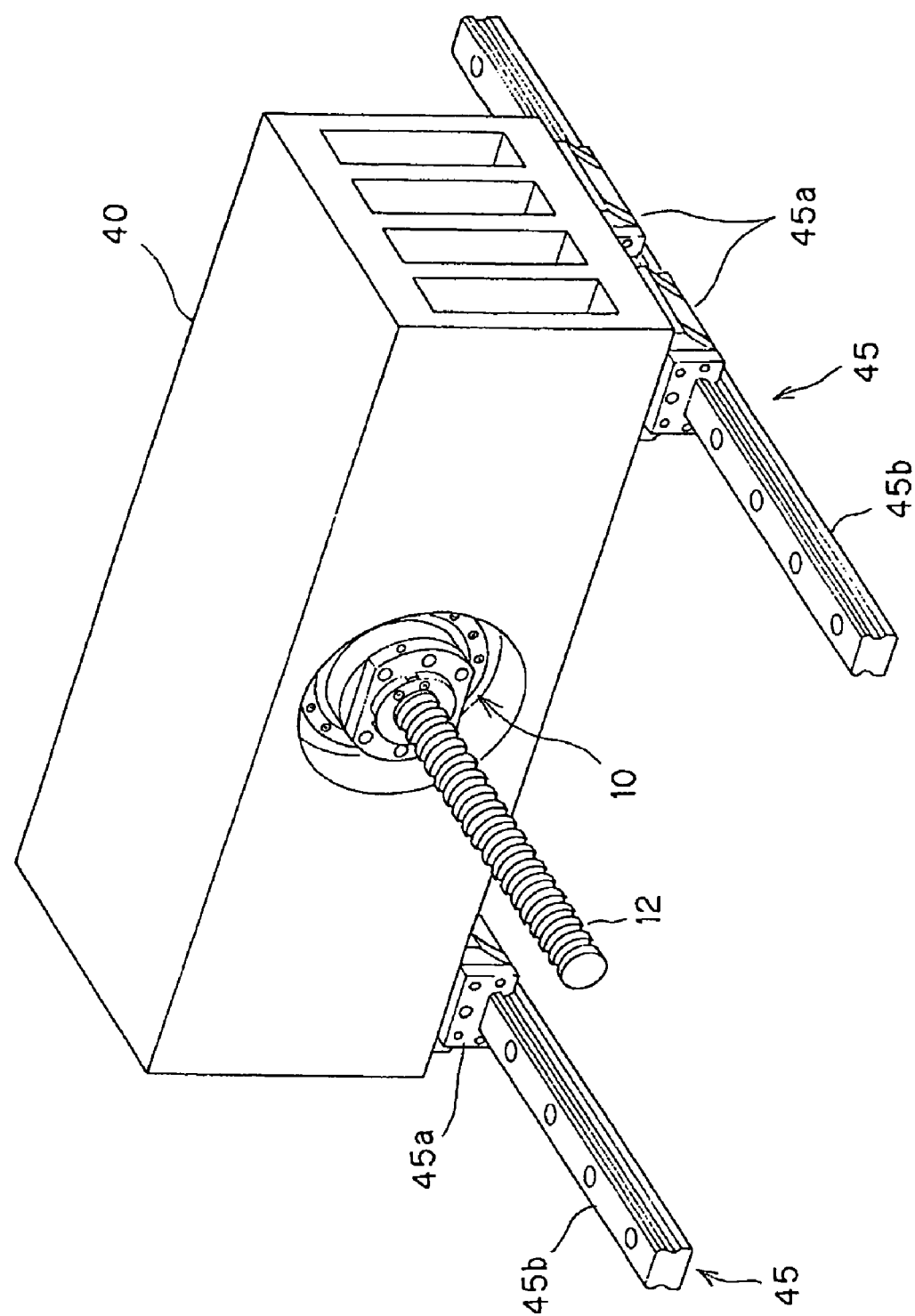
FIG. 4 is a perspective view showing outer configuration of a using example of the hollow motor drive device according to the embodiment.

Further, the block body 40 in the present embodiment shown in FIG. 4 may be recognized as a foot-hold place or article-hold place, for example, and by the combination of the hollow motor drive device 10 of the present embodiment and the two linear guides 45, a drive device having extremely high rigidity and high stop-responsiveness can be realized.

Hereinabove, although the preferred embodiments of the present invention were mentioned, the technical scope of the present invention is not limited to the described range of the above embodiments, and many other changes and modifications may be made to the above embodiments.

For example, with the hollow motor drive device 10 of the present embodiment mentioned above, although there is explained a slide screw composed of by directly screw-engaging the screw shaft 12 and the nut member 13, an endless circulation rolling members (balls or rollers, for example) may be interposed between the screw shaft 12 and the nut member 13 to thereby constitute a rolling member screw device. By employing such structure, the rigidity and stop-responsiveness can be highly enhanced and more smooth operation can be realized.

Furthermore, with the hollow motor drive device 10 of the present embodiment mentioned above, there is employed a structure in which the bearings forming the bearing portion 14 supporting the load caused by the rotating motion of the nut member 13 are disposed in a concentrated manner at a position opposing to the nut member 13. This structure is employed in consideration of the load applied to the hollow drive shaft 25 and the balancing of the hollow drive shaft 25 in the rotating motion, thus being a very preferred structure. However, it may be possible to locate a support bearing at the end portion of the other end side (right side on the drawing of FIG. 2) of the housing 26 in consideration of the further elongation of life of the device and further stability thereof at the driving operation.

It may be apparent that the modes or embodiments to which the above mentioned changes or modifications are applicable are within the technical scope of the present invention from the recitation of the patent claims.

The invention claimed is:

1. A hollow motor drive device, comprising:
a screw shaft provided with a spiral screw groove formed in an outer peripheral surface thereof;
a nut member provided with a nut groove formed in an inner peripheral surface thereof so as to be screw-engaged with the screw groove;
a hollow drive shaft having an inner peripheral side on which the nut member is fixed and an outer peripheral side on which a permanent magnet, as a field magnetic flux generating source, is disposed; and
a housing provided with a bearing portion rotatably supporting the hollow drive shaft and a coil portion as a magnetic field generating source,
wherein, in the hollow drive shaft, the nut member and the permanent magnet are disposed so as not to be overlapped with each other in a direction perpendicular to the axial direction of the hollow drive shaft, and in the housing, the bearing portion is disposed to a position corresponding to the nut member, and the coil portion is disposed to a position corresponding to the permanent magnet, and
wherein the permanent magnet is provided for the hollow drive shaft through a position adjusting mechanism so as to adjust a distance between the permanent magnet and the coil portion, the position adjusting mechanism comprising
a magnet holding member disposed so as to be connected to the permanent magnet,
a spannring interposed between the magnet holding member and the hollow drive shaft, in which movement of one end side toward one end side axial direction is restricted by abutment of the one end against an engaging wall formed to the hollow drive shaft,
a spacer sleeve disposed on another end side of the spannring to be movable in an axial direction of the hollow drive shaft, and
a thrust nut pushing the spannring in the one end side axial direction through the spacer sleeve by screw-engagement with a screw groove formed in a surface of the hollow drive shaft.

2. The hollow motor drive device according to claim 1, the housing includes a bearing accommodation portion accommodating the bearing portion and a coil accommodation portion accommodating the coil portion.

3. The hollow motor drive device according to claim 2, wherein the coil accommodation portion constituting the housing has a detachable structure.

* * * * *